United States Patent
Goodman et al.

(10) Patent No.: US 12,021,983 B2
(45) Date of Patent: Jun. 25, 2024

(54) DISAGGREGATED KEY MANAGEMENT IN A DISTRIBUTED SYSTEM

(71) Applicant: Dell Products L.P., Round Rock, TX (US)

(72) Inventors: Bradley Goodman, Nashua, NH (US); Kirk Hutchinson, Londonderry, NH (US); Anurag Sharma, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 239 days.

(21) Appl. No.: 17/730,471

(22) Filed: Apr. 27, 2022

(65) Prior Publication Data

US 2023/0353358 A1 Nov. 2, 2023

(51) Int. Cl.
*H04L 9/08* (2006.01)
*H04L 9/32* (2006.01)

(52) U.S. Cl.
CPC .......... *H04L 9/0897* (2013.01); *H04L 9/0877* (2013.01); *H04L 9/3268* (2013.01)

(58) Field of Classification Search
CPC .... H04L 9/0897; H04L 9/0877; H04L 9/3268
See application file for complete search history.

(56) References Cited

U.S. PATENT DOCUMENTS

| | | | |
|---|---|---|---|
| 10,122,615 B2 | 11/2018 | Mahadevan et al. | |
| 10,211,985 B1* | 2/2019 | Brandwine | H04L 9/3239 |
| 10,750,366 B1* | 8/2020 | Gundavelli | H04W 12/069 |
| 10,867,052 B1* | 12/2020 | Kumar | G06F 3/067 |
| 11,231,885 B2* | 1/2022 | Muniswamy-Reddy | G06F 3/067 |
| 11,310,198 B2* | 4/2022 | Couillard | H04L 63/0485 |
| 11,652,646 B2* | 5/2023 | Ying | H04L 9/3271 |
| | | | 713/176 |
| 11,824,972 B2* | 11/2023 | Pai | H04L 9/0897 |
| 2019/0222566 A1* | 7/2019 | Trimmer | H04L 63/061 |
| 2021/0112020 A1 | 4/2021 | Radhakhrishnan | |
| 2021/0306164 A1* | 9/2021 | Wei | H04L 9/3273 |
| 2022/0200801 A1* | 6/2022 | Potlapally | H04L 63/0435 |
| 2022/0311757 A1* | 9/2022 | Balasubramanian | H04L 9/0877 |
| 2023/0318807 A1* | 10/2023 | Goodman | H04L 9/0877 |
| | | | 713/171 |

\* cited by examiner

*Primary Examiner* — Viral S Lakhia
(74) *Attorney, Agent, or Firm* — Larson Newman, LLP

(57) ABSTRACT

A control plane management node of a multiple node environment includes a storage and a processor. The processor detects a user of the multiple node environment and provides a plurality of key management configurations to the user. The key management configurations include first and second key management configurations. In response to a first key management configuration being selected, the node creates a private key for the user, and stores the private key within a storage of the node. In response to the second key management configuration being selected, the node configures the user node to create the private key, and configures the user node to store the private key within a storage of the user node.

17 Claims, 6 Drawing Sheets

DISAGGREGATED KEY MANAGEMENT IN A DISTRIBUTED SYSTEM

FIELD OF THE DISCLOSURE

The present disclosure generally relates to information handling systems, and more particularly relates to disaggregated key management in a distributed system of multiple information handling systems.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A control plane management node may detect a user of a multiple node environment and provide key management configurations to the user. In response to a first key management configuration being selected, the node may create a private key for the user, and store the private key within a storage of the node. In response to the second key management configuration being selected, the node may configure the user node to create the private key, and may configure the user node to store the private key within a storage of the user node.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
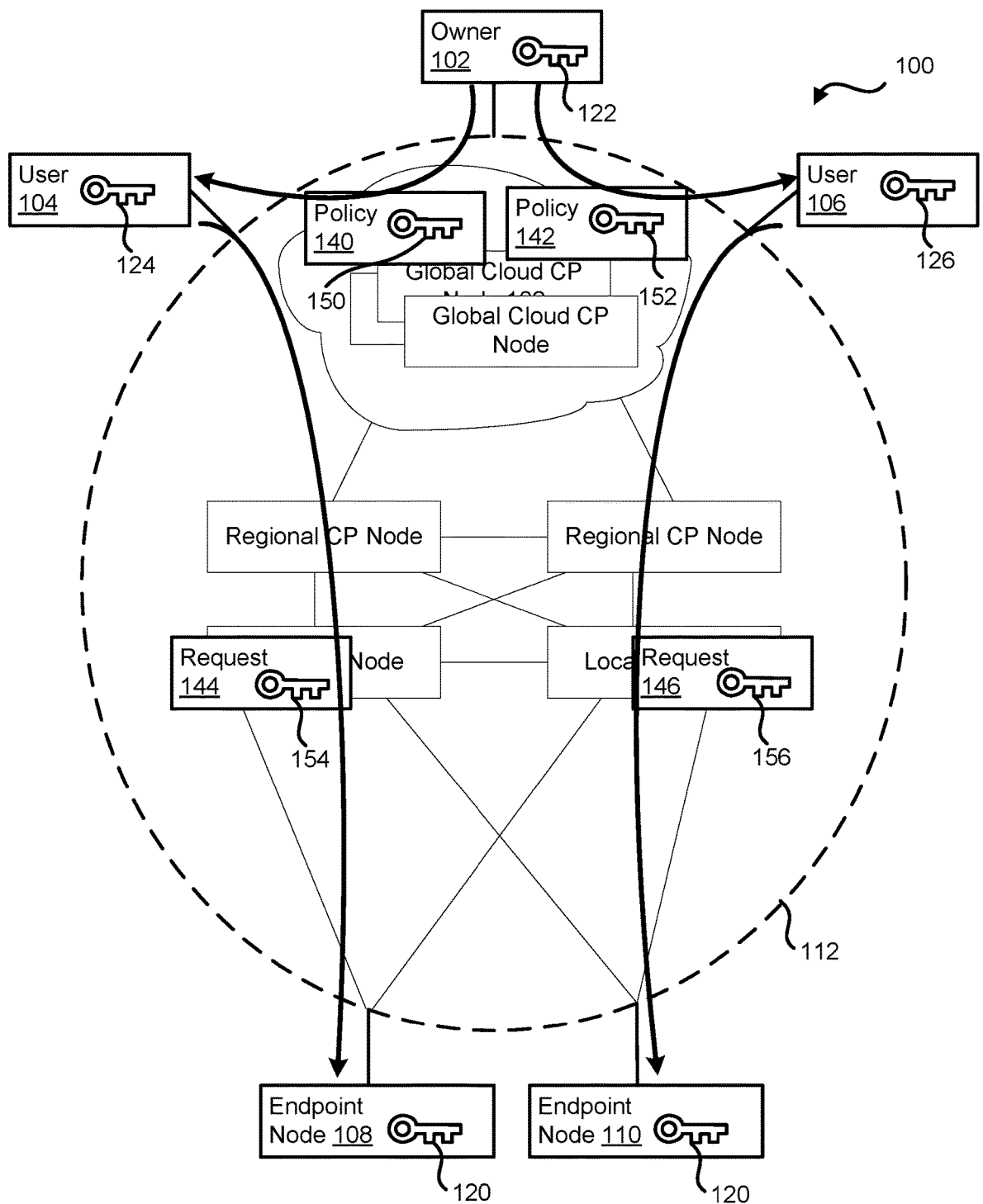
FIG. 1 is a block diagram of a multiple node environment according to at least one embodiment of the present disclosure.

FIG. 1 illustrates a multiple node environment 100 according to at least one embodiment of the present disclosure. Multiple node environment 100 includes an owner node 102 and user nodes 104 and 106 that may access endpoint nodes 108 and 110 through a control plane 112. Control plane 112 may include any suitable number of global cloud control-plane (CP) nodes, regional CP nodes, and local CP nodes. In an example, global CP nodes, regional CP nodes, local CP nodes, and endpoint nodes 108 and 110 may be any suitable information handling systems, such as substantially similar to information handling system 600 of FIG. 6, wherein each node may include a storage and a processor as described above with respect to FIG. 6. Multiple node environment 100 may include any suitable number of global CP nodes, regional CP nodes, local CP nodes, and endpoint nodes 108 and 110 without varying from the scope of this disclosure.

In an example, each of endpoint nodes 108 and 110 may store an owner public key 120 in a respective storage within each endpoint node. Owner public key 120 may be utilized by endpoint nodes 108 and 110 to authenticate any received messages. In certain examples, owner public key 120 may be hard coded within endpoint nodes 108 and 110 or any other suitable node outside of the control plane of multiple node environment 100. Owner public key may be associated with owner node 102 of endpoint nodes 108 and 110, such as a company, a user, or the like. In an example, security of owner public key 120 may be increased based on the owner public key being stored within a trusted platform module (TPM) of endpoint node 108 and in a TPM of endpoint node 110.

Owner node 102 may include an owner private key 122, user node 104 may include a user private key 124, and user node 106 may include a user private key 126. In an example, security of private keys 122, 124, and 126 may be increased based on owner private key 122 being stored within a TPM of owner information handling system 102, user private key 124 being stored within a TPM of user information handling system 104, and user private key 126 being stored within a TPM of user information handling system 126. In an example, storage of different keys within different nodes of multiple node environment 100 may be controlled by policies 140 and 142. User node 104 may provide a request 144 to any node, such as endpoint node 108, within multiple node environment 100. Similarly, user node 106 may provide a request 146 to any node, such as endpoint node 110, within multiple node environment 100. In certain examples, policy 140 may include a key 150 and policy 142 may include a key 152. Request 144 may include any suitable number of keys, such as key 154, in any suitable number of certificates within the request. Request 146 may include any suitable number of keys, such as key 156, in any suitable number of certificates within the request.

In certain examples, multiple node environment 100 may be an isolated, disconnected, or disaggregated environment. As used herein, an isolated, disconnected, or disaggregated environment may include an environment with control planes that expand beyond a simple rack or datacenter, beyond a highly available cloud service, or the like. For example, an isolated, disconnected, or disaggregated environment may expand to devices beyond buildings, vessels, cities, continents, the edges of the planet, or the like. In an example, the further the control planes expand the more disaggregated the entire environment or topology becomes, including the control plane itself. As such, the communication links or paths illustrated between the nodes of multiple node environment 100 may cover any suitable distance.

In an example, multiple node environment 100 may be disaggregated when the multiple node environment has any suitable characteristics. For example, characteristics of a disaggregated multiple node environment 100 may include, but are not limited to, no defined hierarchy of authority, information may flow in any direction, information may originate from any point or node within the environment, topologies of the environment may be large, and connectivity between nodes may be bad, intermittent, or questionable or any suitable reason. For example, connectivity may be bad, intermittent, or questionable because of connectivity issues, limitations, problems or costs at remotes sites or nodes, such as endpoint nodes 108 and 110. Connectivity may be bad, intermittent, or questionable by design due to security concerns, such as a desire to keep machines, such as endpoint nodes 108 and 110, offline or hidden. Connectivity may be bad, intermittent, or questionable because of the mere scale of multiple node environment 100. For example, the larger or more nodes within multiple node environment 100, the greater the odds of something being wrong at a given point-in-time.

Additionally, a disaggregated multiple node environment 100 may have no defined hierarchy of authority between global cloud CP nodes, regional CP nodes, and local CP nodes. In this situation, no specific node may be 'in-charge' or hold any 'authoritative' piece of information. In a particular situation, if a node is 'in-charge' or 'authoritative', it may not be clear as to the node that is authoritative. For example, one control plane could serve different entities, such as plants, divisions, tenants, or companies, and each entity may have its own concept of 'authority'. In an example, these authorities may be centered around different places on a topology.

In certain examples, information may flow in any direction in multiple node environment 100, and the information may provide different purposes. For example, some of the information may be provided for certificate or other data replication purposes, some of the information may be provided for command/control/response purposes, or the like. In an example, information may originate from any node within multiple node environment 100. In certain examples, not all data is replicated in all nodes of multiple node environment 100. Additionally, data that is replicated in all nodes may not be considered to be consistent among all of the nodes. In fact, the replicated data may be inconsistent more than it is consistent among nodes based on a topology of multiple node environment 100.

In an example, multiple node environment 100 may include different topologies, such as an 'east/west' or peer nodes topology, 'north/south' or hierarchy nodes topology nodes, or the like. Peer nodes, such as regional nodes or local CP nodes, may generally share data and work closely together for availability purposes within multiple node environment 100. In topologies between hierarchy nodes, such as one regional node and a local CP node, the regional node may be responsible for overall management of a region, and the local CP node may be responsible for more day-to-day operations of a specific site. Topologies may be large, complex.

In certain examples, distributed systems, such as multiple node environment 100, may be inherently not monolithic. When a simple access system is distributed, the system may become difficult or impossible to secure, such that the system is left open for wider attack vectors. In an example, distributed or disaggregated multiple node environment 100 may have any suitable number of complexities including, but not limited to, storage of information, logic to make decisions based on the stored information, and the actions performed by an entity or endpoint node.

In multiple node environment 100, the information should be shared and synchronized among the nodes in the environment or system. However, as the size of multiple node environment 100 increases, the chance of the information in each node being out-of-synchronization at any point-in-time also increases. Additionally, the synchronization rules in multiple node environment 100 become more complex. In this situation, the complexity of the synchronization rules and the large size of multiple node environment 100 may result in conflicts between merging/synchronizing the states of endpoints 108 and 110. For example, if the state of endpoint node 108 has a first user as an administration but the state of endpoint node 110 has the first user as a user, there should be a way to reconcile the different states. In certain examples, a way or rule to reconcile the different states is to make the state stored in each endpoint node 1208 and 110 to be authoritative for that endpoint node. For example, anything stored in endpoint node 108 must be accepted as true in endpoint node 108, and anything stored in endpoint node 110 must be accepted as true in endpoint node 110.

In an example, information may be stored and synchronized in one node, such as endpoint node 108, but the logic that uses the stored information to make access decisions may be located or stored in another node, such as a CP node. In this example, the data or information may need to be stored in the correct node, such as endpoint node 108, may be needed to enable a CP node to implement the access decision logic. This storage of the correct data or information may need to be done in any situation including, but not limited to, during periods when endpoint node 108 is disconnected from the other nodes of multiple node environment 100. In this situation, a CP node may need either real-time online access to a storage device within endpoint node 108, or constant replication of the information within multiple node environment 100. In an example, a CP node should be assured that the stored device within endpoint node 108 is authoritative before the logic of the CP node accesses the storage device. In this example, a secure, verifiable communications channel should be established between the logic of the CP node and the storage device of endpoint node 108, and the assumption that once established, the communication channel is accurate.

In a distributed multiple node environment 100, the entity or node performing the final action, such as giving a user a file, may or may not be separate from the nodes implementing the logic. If the node is separate from node with the logic, it therefore means it's up to another node to implement the logic. In this situation, the node providing the data to the user should know of the separate node that will apply the logic and make access decisions. The node providing the data may not have any specific knowledge, such as storage or rules, such that the node providing the file must blindly trust the decisions of the node with the logic. Thus, if the node with the logic becomes compromised, this node may completely take over any and all aspects of that 'trusting' endpoint.

In certain examples, the operations of storage, logic, and providing of data may be performed by different nodes within multiple node environment 100. In these examples, each of the different nodes performing different operations may even more complexity to multiple node environment 100. As multiple node environment 100 increases in size, becomes more distributed or disaggregated, endpoint nodes 108 and 110 may have no control over data access. For example, other nodes within multiple node environment 100 may control replication of storage data while other nodes may implement the logic, and endpoint nodes may have to blindly trust the decisions and authority of these upstream control nodes. In this example, endpoint nodes 108 and 110 may be at the mercy of a large, distributed control system with many nodes, and a compromise at any one of these control plane nodes would compromise the entire multiple node environment 100.

In an example, if control plane 112, or the CP nodes within the control plane, is deemed to be authoritative by endpoints 108 and 110, a breach of the control plane may result in unmitigated control over those endpoints by an attacker. For example, if one or more CP nodes within control plane 112 control a set of one or more downstream systems, such as endpoint nodes 108 and 110, and is required to present cryptographic credentials to communicate to those systems, the nodes of the control plane must hold those credentials or private keys. In this situation, the storage of private keys within nodes of control plane 112 may presents a growing vector of attack or security threat as the control system grows larger, and/or those credentials require replication, and placement starts to extend into less controlled and trusted places with respect to network connectivity and physically.

In previous multiple node environments or systems, many applications, such as a web site, would understand the concept of users and permissions. For example, the application may know which users were authorized to perform which actions. In these previous information handling systems, simple logic performed by the application or web site would determine if any user was allowed to perform a given task. However, if this web site was acting as a proxy agent for another service, such as an Internet of Things (IoT) device, the web site would be unilaterally be responsible for providing actions for an end-device to perform when the web site deems a user authorized to control the actions. In this situation, the authorization credentials for all the IoT devices are stored within the web site applications which leaves the authorization credentials vulnerable to an attack. Thus, an attack on the application would expose all devices under the control of the application to the attack.

Multiple node environment 100 and endpoint nodes 108 and 110 may be improved by the different disaggregated key managements described herein. In an example, disaggregated key management may include, but is not limited to, storing useful, authorizing keys on the outside of control plane 112. For example, the authorizing keys may be stored in a file on information handling systems or nodes 102, 104, and 106, in storages, such as key vaults, in offline USB drives, in offline nodes, within a TPM of an information handling system or node, or the like. In an example, the storing of the authorizing keys outside of control plane 112 may increase the security of the keys by removing large and distributed key stores from the control plane. Additionally, storage of the authorizing keys outside of control plane 112 may limit the authorization to only one authorizer, which in turn reduces the vulnerability of any one breach, allows a diversity of key management policies, and allows selection of convenience as compared security on a per-key or per-service basis.

Multiple node environment 100 and endpoint nodes 108 and 110 may also be improved by all authority of a control system by derived exclusively from keys, such as keys 122, 124, and 126, which are used to authorize actions, not from an anointed authority of explicit trust of control plane 112. In an example, security within multiple node environment 100 may be improved by keys 122, 124, and 126 being primarily generated, stored, and used only outside control plane 112. While keys 122, 124, and 126 may be stored outside of control plane 112, the control plane may convey messages or requests 144 and 146 that are signed with these keys. In this situation, endpoint nodes 108 and 110 may trust the validity of messages 144 and 146 based only upon the signatures within the messages. Thus, multiple node environment 100 may be improved by separating the storage and use of encryption keys 122, 124, and 126 from the practical use of these keys, such that the keys may be kept away from the entire control plane 112 until and only if-and-when the keys are needed.

Figure 2:
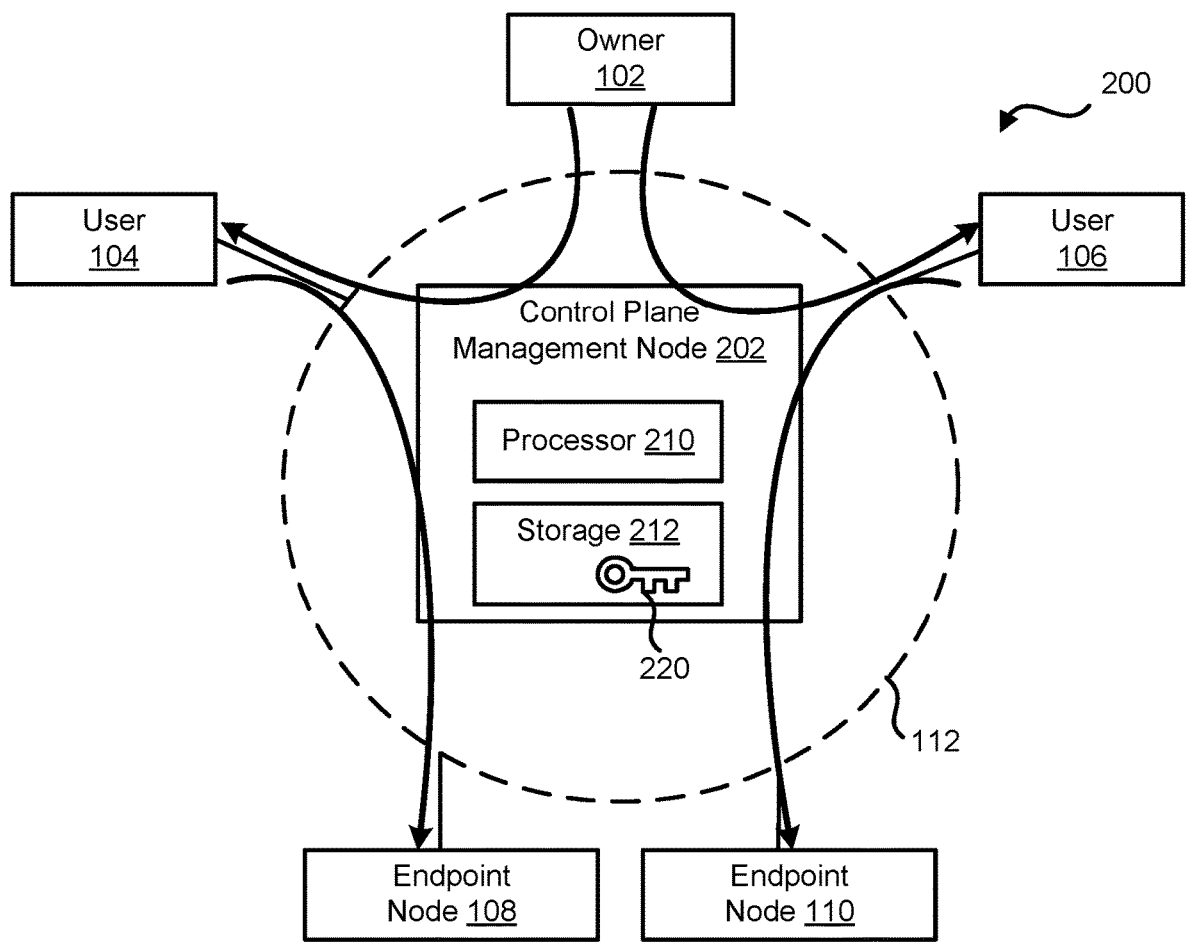
FIGS. 2-4 are diagrams of different embodiments of key management in a distributed multiple node environment according to at least one embodiment of the present disclosure.
Figure 3:
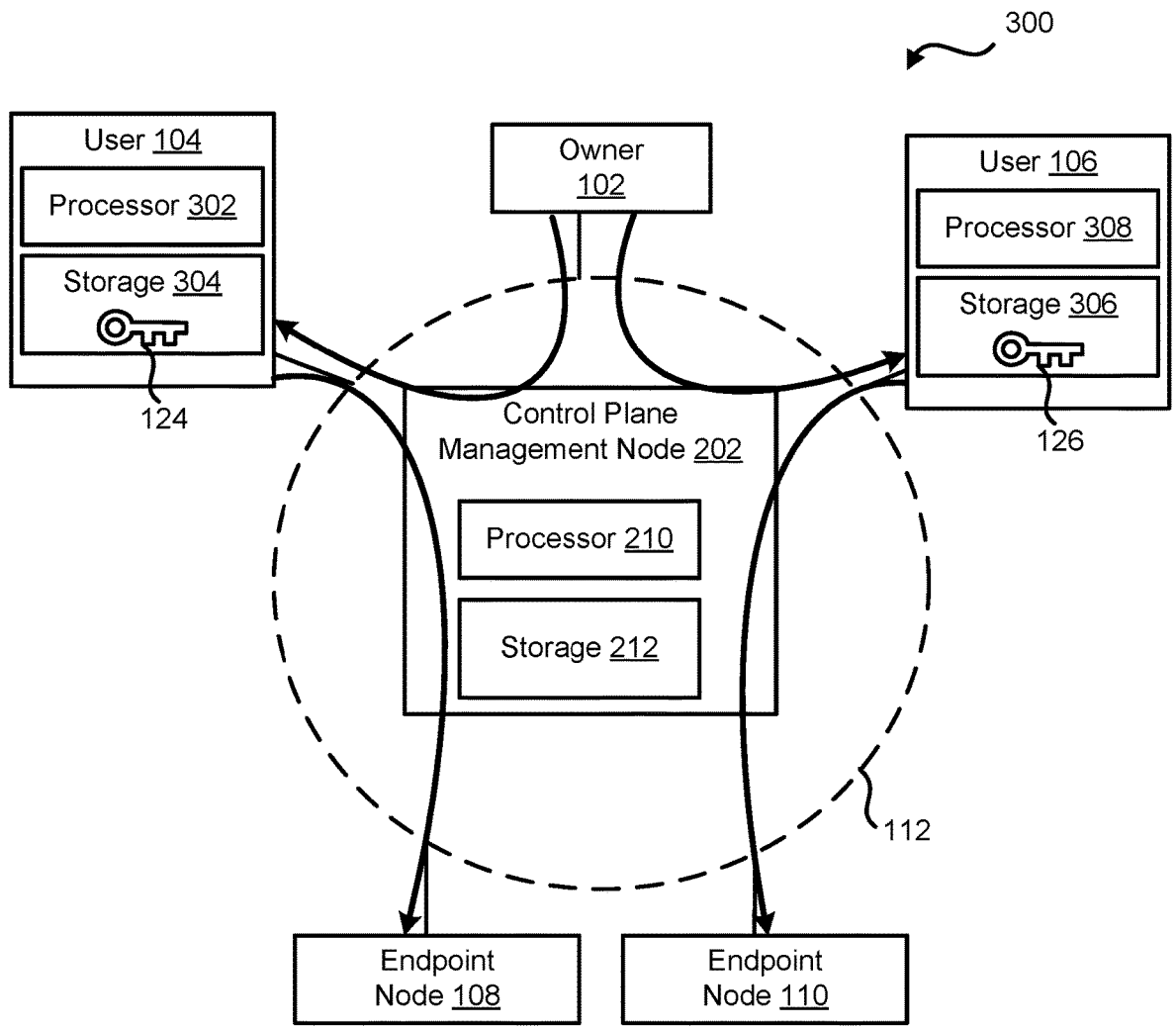
Figure 4:
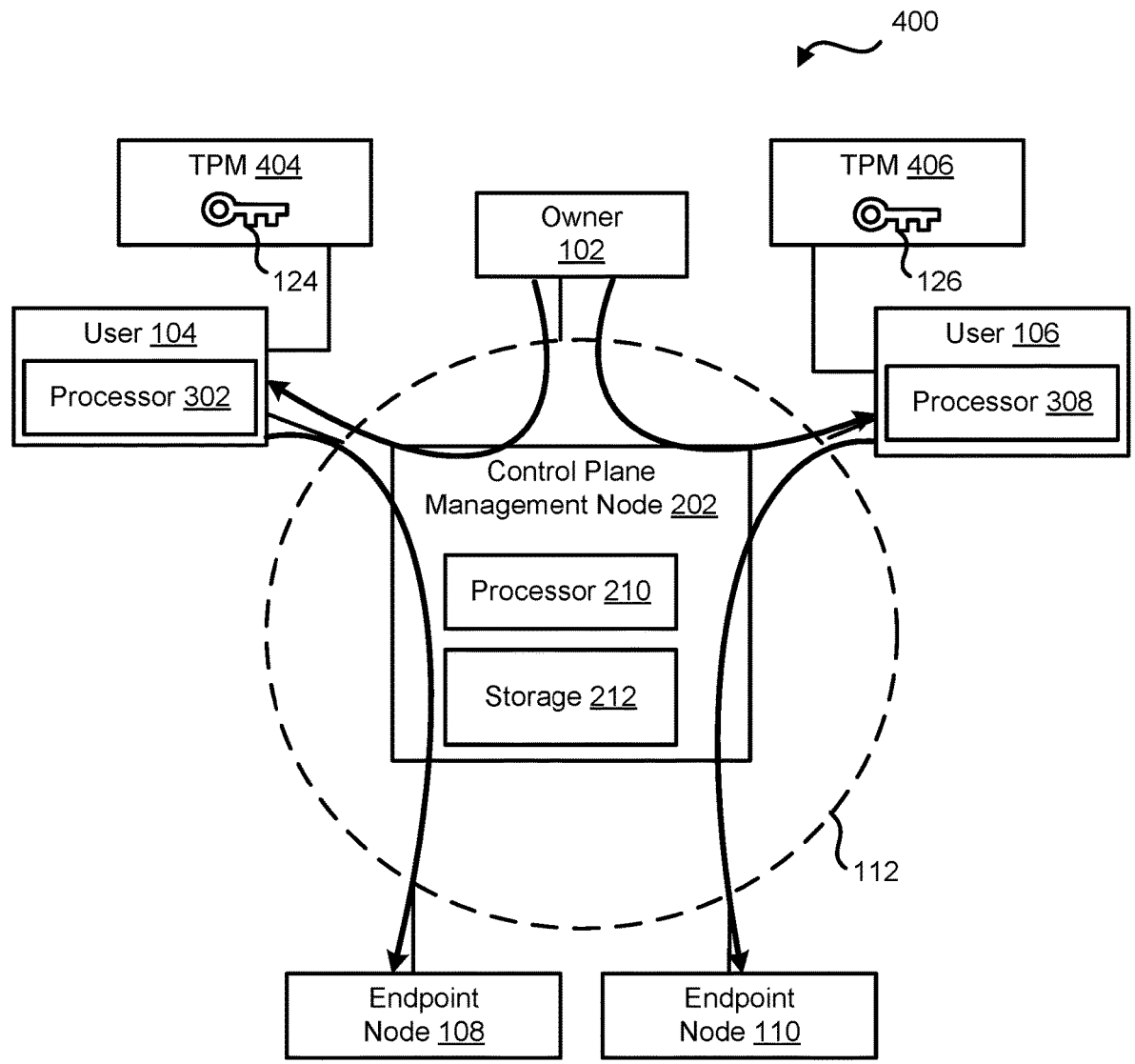

FIGS. 2-4 illustrate different configurations 200, 300, and 400 of key management in a distributed multiple node environment according to at least one embodiment of the present disclosure. Each of the different key management configurations 200, 300, and 400 include owner node 102, user nodes 104 and 106, endpoint nodes 108 and 110, and a control plane 112. Control plane 112 may include any suitable number of CP nodes including, but not limited to, CP management node 202, which in turn includes a processor 210 and a storage 212. Owner node 102 includes owner private key 122, and each of endpoint nodes 108 and 110 include owner public key 120.

In certain examples, CP nodes of control plane 112 may send messages, monitor services, collect data, and generate requests, such as requests 144 and 146 of FIG. 1. CP nodes of control plane 112 may always be connected in real-time. However, when a user or service wants to initiate a request or change, keys may need to be applied. During normal operation of multiple node environment 100, keys may be only needed at certain touchpoints where changes are initiated and permissions are needed. In these situations, CP management node 202 may limit when, where, and how-often keys may be needed. The different distributed key configurations 200, 300, and 400 may isolate or protect keys by making the keys difficult to access, cryptographically or physically secure, or the like. The keys in multiple node environment 100 may be held in an information handling system of the user, such as owner node 102, user node 104 or user node 106, as opposed to storing the keys in different CP nodes of control plane 112. Based on the storage of the keys in owner node 102 and user nodes 104 and 106, endpoint nodes 108 and 110 may trust authorization from the keys, and not nodes within control plane 112 that are controlling the endpoint nodes.

In an example, multiple node environment 100 may be more secure as compared to previous disaggregated multiple node environments based on the private keys that were previously held in the CP nodes of control plane 112 are not present in the CP nodes of the control plane in multiple node environment 100.

Referring now to FIG. 2, in distributed key configuration 200, CP management node 202 may fully and transparently handle keys and certificates on behalf of a user, such as owner 102 and users 104 and 106. In this situation, CP management node 202 may create a certificate and public/private key-pair on behalf of owner 102, user 104, or user 106, and may retain the keys in storage 212 and manage the keys via processor 210. In an example, CP management node 202 may simplify key management in distributed key configuration 200 and may save a user from having to control the key management. In this example, CP management node 202 must protect, and secure the key for each user.

In certain examples, CP management node 202 may have the responsibility sign requests, such as request 144 and 146 of FIG. 1, on behalf of a user. Thus, CP management node 202 may be a trusted resource in multiple node environment because the CP management node has the responsibility in managing the secure keys. However, based one or more keys 220 being stored in storage 212 of CP management node 202, an attack vector may be created by the keys being able to be stolen from the CP management node in control plane 112. In an example, if control plane 112 is distributed and/or redundant, the keys may need to be replicated and stored among other CP nodes, which in turn may increase the potential attack vector.

In an example, processor 210 of CP management node 202 may perform one or more suitable operations to fully manage private keys for users 104 and 106. For example, processor 210 may create a key for a user, such as user 104, based on any suitable event. In an example, when a new user, such as user 104 logs onto multiple node environment 100, processor 210 may create a key for the user. Additionally, when a determination is made that a key is needed for user 104, processor 210 may create a key for the user. Further, if owner 102 grants permissions to user 104, processor 210 may create a key 220 for the user. In response to processor 210 creating key 220, the key may be stored within storage 212 of CP management node 202. In an example, key 220 may be a private key associated with user 104.

In certain examples, user 104 may request that a task be performed, such as rebooting endpoint node 108, which needs to be signed by a private key of a user authorized with the particular permissions to control the endpoint node. In response to the request, processor 210 of CP management node 202 may sign the request with private key 220 associated with user 104. In an example, CP management node 202 creating and storing private key 220 may enable user 104 to not have to manage the private key and may operate similarly to a traditional control plane. However, storing private key 220 in storage 212 of CP management node 202 and processor 210 possibly replicating the private key to other CP nodes may cause a security issue within multiple node environment 100. For example, endpoint node 108 may never be able to verify that user 104 signed the request, because CP management node 202 actually signs the request and a different user or an attacker may have cause the CP management node to sign the request.

Referring now to FIG. 3, user node 104 includes a processor 302 and a storage 304. Similarly, user node 106 includes a storage 306 and a processor 308. In an example, CP management node 202 may perform one or more suitable operations to enable users 104 and 106 manage private keys for the users outside of CP 112. For example, processor 210 may notify or direct a user, such as user 104, to create a key for the user based on any suitable event. In an example, when a new user, such as user 104 logs onto multiple node environment 100, processor 210 may notify or direct the user node to create a key for the user. Additionally, when a determination is made that a key is needed for user 104, processor 210 may notify or direct the user node to create a key for the user. Further, if owner 102 grants permissions to user 104, processor 210 may notify or direct the user node to create a key for the user. In an example, processor 302 may perform one or more suitable operations to create private key 124 and store the private key in storage 304. Similarly, processor 308 may generate private key 126 and store the private key in storage 306.

In an example, when a user request, such as a request from user 104, to perform a task warrants signing, the user node may download a certificate associated with the user request. In response to the certificate being downloaded, processor 302 may perform one or more suitable operations to create or generate a signed certificate. For example, processor 302 may open private key 124 file, open the downloaded certificate, and sign the certificate with private key 124 to generate a signed certificate. In response to the certificate being signed, CP management node 202 may request that user node 104 upload the signed certificate so that the CP management node may provide the certificate to endpoint node 108.

In an example, an advantage of private keys 124 and 126 being generated, stored, and utilizing in signing certificates outside of control plane 112 may be that the keys are never located within CP management node 202 of control plane 112. In this example, users 104 and 106 may have the ability to protect the respective private keys 124 and 126 by storing the private key in respective storage 304 and 306. However, private keys 124 and 126 may be stolen from respective user node 104 and 106.

Referring now to FIG. 4, in distributed key configuration 400, user node 104 includes a trusted platform module (TPM) 404. User node 106 includes a TPM 406. In an example, TPM 404 may perform one or more suitable operations to create private key 124 and store the private key. Similarly, processor 414 of TPM 406 may generate private key 126 and store the private key. In certain examples, TPMs 404 and 406 may create respective private 124 and 126 based on any event described above with respect to FIG. 3. In an example, private keys 124 and 126 may never be read or exported from respective TPMs 404 and 406 to provide security of the private keys. In certain examples, the generation of private keys 124 and 166 may be performed in any suitable manner. For example, the key generation may be performed in accordance with other TPM security policies including, but not limited to, password requirements, one-time-authorization codes, dictionary attack protections, and device attestation.

In an example, when a user request, such as a request from user 104, to perform a task warrants signing, the user node may download a certificate associated with the user request from CP management node 202. In response to the certificate being downloaded, TPM 404 may perform one or more suitable operations to create or generate a signed certificate. For example, TPM 404 may open private key 124 file, open the downloaded certificate, and sign the certificate with private key 124 to generate a signed certificate. In an example, TPM 404 may utilize private key 124 to sign the certificate based on any suitable TPM policies, such as requiring a password, a one-time-authorization code, or the like. In response to the certificate being signed, the signed certificate may be stored within a storage of user node 104. CP management node 202 may request that user node 104 upload the signed certificate so that the CP management node may provide the certificate to endpoint node 108. Based on this request, processor 302 may provide the signed certificate to CP management node 202, and processor 210 may provide the request with the signed certificate to endpoint node 108.

In an example, an advantage of private keys 124 and 126 being generated, stored, and utilizing in signing certificates within TPMs 404 and 406 may be that the keys cannot be stolen from the TPMs of user nodes 104 and 106. In this example, TPMs 404 and 406 may provide strong security for privates keys 124 and 126 especially with proper TPM storage and security practices. However, if appropriate protections, such as one-time keys, are not utilized within TPMs 404 and 406, malicious code may be able to sign a certificate on behalf of respective user node 104 and 106.

In certain examples, nodes 104, 106, and 202 may include any suitable components described above to provide a user options for to select one of the different distributed key management configurations 200, 300, and 400. In an example, when a new user, such as user 104, connects to multiple node environment 100, CP management node 202 may provide the user multiple options for possible key management configurations. User 104 may select one of the configurations 200, 300, and 400 described above. While each of the key management configurations described above may be available as selectable options, only a few configurations will be described here.

In an example, one distributed key configuration, such as configuration 200 of FIG. 2, may enable CP management node 202 to create and store a private key for the user. Another selectable configuration may allow user node 104 to generate a public/private key pair, upload the public key to CP management node 202, and store the private in a storage of the user node. In an example, CP management node 202 may provide the public key to any node within the multiple node environment, such as endpoint nodes 108 and 110 of multiple node environment 100 of FIG. 1. Another selectable configuration may utilize a TPM within user node 104 to generate and store the user private key.

In certain examples, the selectable distributed key configurations may also include any suitable number of options for utilizing the generated and stored private key. For example, if the user has a private key held and managed within user node 104, CP management node 202 may prompt the user to sign a certificate for a request with the stored private key. Another option for user 104 may be for the user to download the request certificate so that the user node may sign the certificate for offline signing within the user node. When an offline signing of the certificate is selected, user 104 may download the certificate, run a signing application in a processor of the user node, specify a private key in a storage of the user node or in a TPM, and then sign the certificate with the private key in the user node or the TPM. In response to the certificate being signed, CP management node 202 may give user 104 the option to upload the newly signed request certificate.

In an example, the distributed key configuration options may be policy driven. Administrators of multiple node environment 100 may choose to allow, disallow or mandate any of the above configurations within the multiple node environment. For example, an administrator may set CP management node 202 to disallow any storage of the private keys within control plane 112, require all certificates to be managed by a TPM of the user node, or the like.

In certain examples, different key management practices or configuration may be used for different keys. For example, some keys associated with personnel on a factory floor may be utilized often to frequently stop and start nodes from computers at many locations. In this example, the key management practice may be to have these keys stored on a local control-plane node. In another example, keys associated with more secure management tasks, such as redeploying new code on a node or information handling system, may result in tighter security with the keys being stored in a TPM, in a remote system, or offline.

As described herein, CP management node 202 may not have any special privileges, such authority to control any nodes within multiple node environment 100. In an example, the power of permission may be granted by generated private keys alone and not to any particular node. As compared to storing the keys within nodes of control plane 112, key security may be increased by the keys being storage outside the control plane and the keys never being sent to the control plane. In this situation, CP management node 202 of control plane 112 may pass certificates to be signed to the user nodes, and then receive the signed certificates from the user nodes. In an example, the storage of private keys outside control plane 112 may prevent an attacker of the control plane from being able to perform any meaningful actions because the keys are not located within the control plane.

In certain examples, the public/private key pairs generated in multiple node environment 100 may have a unique property in that the private keys may be generated, stored, and utilized for signing outside of control plane 112 to reduce a risk of the private keys being compromised. Multiple node environment 100 may have a reduce size of an attack vector as compared to previous systems because even though the user nodes may be compromised, these user nodes may be spread out among many users and individual information handling systems. In certain examples, each user node may have a different private key, which may further reduce the size of attack vector. For example, if one particular node is compromised only the private key for that particular node is comprised and not the private keys for any other nodes within the multiple node environment 100. In this example, the breach would be limited to only the operations the private key for the compromised node is authorized to perform.

Additionally, as described herein, the used of hardened key stores, such as a TPM, may increase security for the private keys, which in turn may improve security for endpoint nodes that deem certificates signed with the private keys as authoritative. In this situation, an attacker would not be able to steal the private key, but may only use the corresponding user node fraudulently sign certificates. In an example, enhancing a TPM with other authorization methods, such as TOTP, would make it so even if an attacker got access to such the user node, the attacker would not even be able to sign requests. As described herein, keys may be generated, stored, and used for signing on offline systems, which may further make it impossible to access, steal, or use keys.

Figure 5:
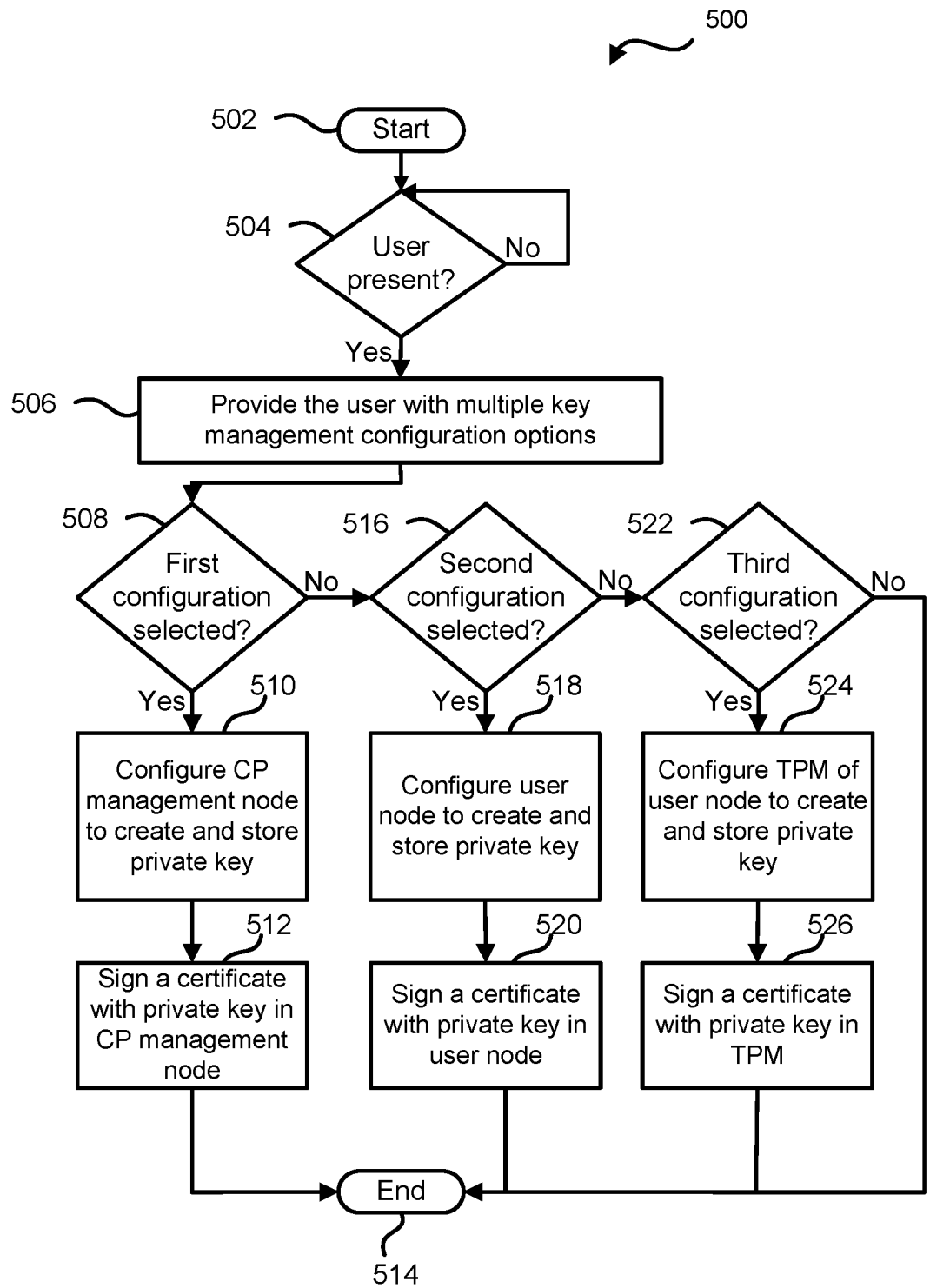
FIG. 5 is a flow diagram of a method for selecting and utilizing different distributed key management configurations according to at least one embodiment of the present disclosure.

FIG. 5 illustrates a flow of a method 500 for selecting and utilizing different distributed key management configurations according to at least one embodiment of the present disclosure, starting at block 502. It will be readily appreciated that not every method step set forth in this flow diagram is always necessary, and that certain steps of the methods may be combined, performed simultaneously, in a different order, or perhaps omitted, without varying from the scope of the disclosure.

At block 504, a determination is made whether a new user in present in a multiple node environment. In response to a new user being present, the user may be provided with multiple key management configuration options at block 506. In an example, a CP management node may provide the user with any suitable number of key management configurations options, such as five different configurations. The user may select one of the key management configurations. In another example, an administrator of the multiple node environment and CP management node may enact one or more policies to select a key management configuration based on a need of the user.

At block 508, a determination is made whether a first configuration has been selected. In response to the first configuration being selected, the CP management node may configure the key management so that the CP management node may create a private key for the user and may store the key within a storage of the CP management node at block 510. At block 512, the CP management node may utilize the private key to sign a certificate for a request by the user to perform one or more operations at an endpoint node, and the flow ends at block 514.

If the first configuration has not been selected, a determination is made whether a second configuration has been selected at block 516. In response to the second configuration being selected, the CP management node may configure the key management so that the user node may create a private key for the user and the key may be stored within a storage of the user node at block 518. In an example, the storage of the key within a node or information handling system associated with the user may be in a storage of the user node, within a removable device, or the like. At block 520, the user node may utilize the key to sign a certificate for a request by the user to perform one or more operations at an endpoint node, and the flow ends at block 514.

If the second configuration has not been selected, a determination is made whether a third configuration has been selected at block 522. If the third configuration has not been selected, the flow ends at block 514. In response to the third configuration being selected, the CP management node may configure the key management so that a TPM of the user node may create a private key for the user and the key may be stored within the TPM at block 524. At block 526, the TMP may utilize the key to sign a certificate for a request by the user to perform one or more operations at an endpoint node, and the flow ends at block 514.

Figure 6:
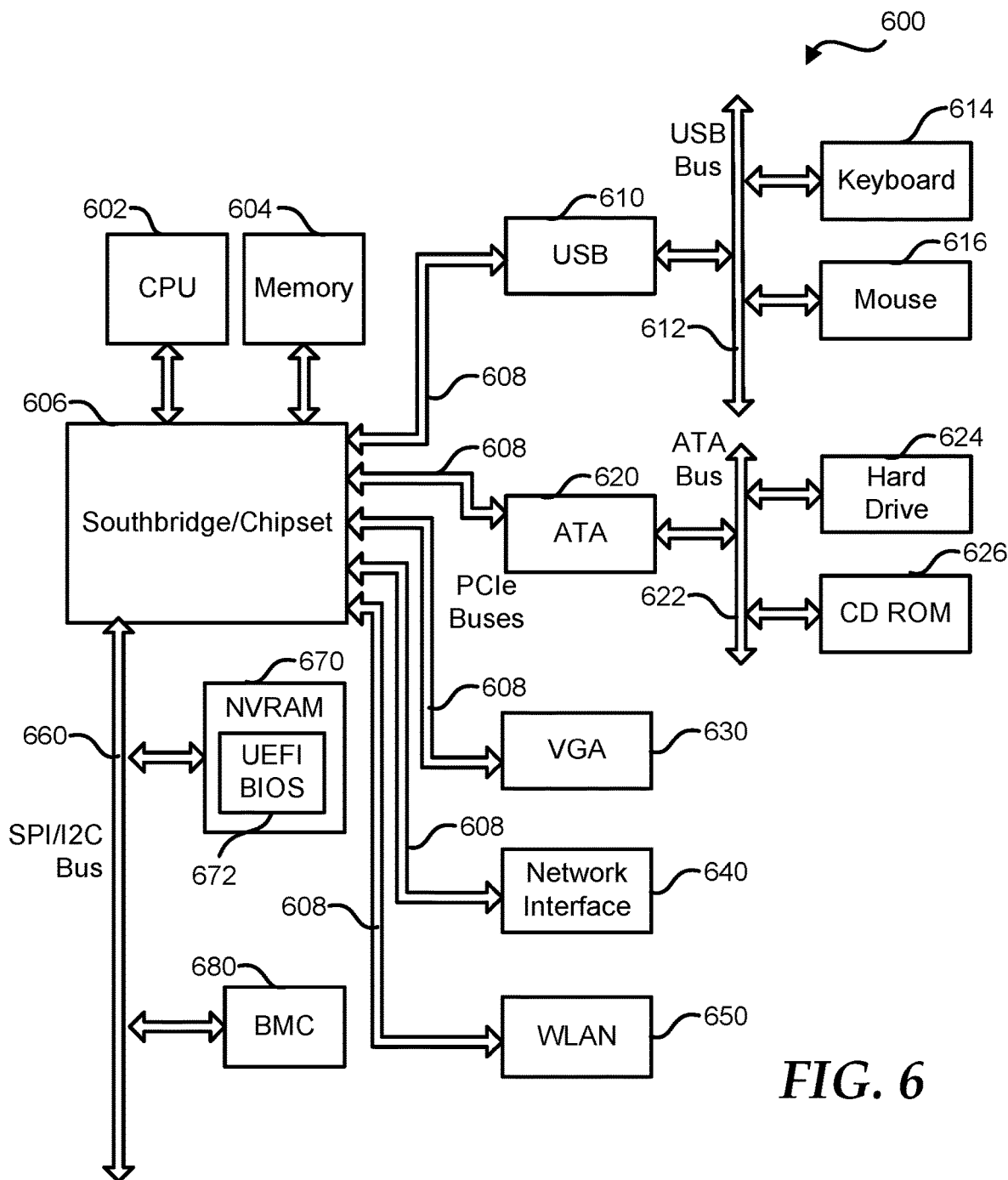
FIG. 6 is a block diagram of a general information handling system according to an embodiment of the present disclosure.

FIG. 6 illustrates a general information handling system 600. For purpose of this disclosure information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price.

Information handling system 600 includes a processor 602, a memory 604, a chipset 606, a PCI bus 608, a universal serial bus (USB) controller 610, a USB 612, a keyboard device controller 614, a mouse device controller 616, a configuration database 618, an ATA bus controller 620, an ATA bus 622, a hard drive device controller 624, a compact disk read only memory (CD ROM) device controller 626, a video graphics array (VGA) device controller 630, a network interface controller (NIC) 640, a wireless local area network (WLAN) controller 650, a serial peripheral interface (SPI) bus 660, a flash memory device 670 for storing UEFI BIOS code 672, a trusted platform module (TPM) 680, and a baseboard management controller (EC) 690. EC 690 can be referred to as a service processor, and embedded controller, and the like. Flash memory device 670 can be referred to as a SPI flash device, BIOS non-volatile random access memory (NVRAM), and the like. EC 690 is configured to provide out-of-band access to devices at information handling system 600. As used herein, out-of-band access herein refers to operations performed without support of CPU 602, such as prior to execution of UEFI BIOS code 672 by processor 602 to initialize operation of system 600. In an embodiment, system 600 can further include a platform security processor (PSP) 674 and/or a management engine (ME) 676. In particular, an x86 processor provided by AMD can include PSP 674, while ME 676 is typically associated with systems based on Intel x86 processors.

PSP 674 and ME 676 are processors that can operate independently of core processors at CPU 602, and that can execute firmware prior to the execution of the BIOS by a primary CPU core processor. PSP 674, included in recent AMD-based systems, is a microcontroller that includes dedicated read-only memory (ROM) and static random access memory (SRAM). PSP 674 is an isolated processor that runs independently from the main CPU processor cores. PSP 674 has access to firmware stored at flash memory device 670. During the earliest stages of initialization of system 600, PSP 674 is configured to authenticate the first block of BIOS code stored at flash memory device 670 before releasing the x86 processor from reset. Accordingly, PSP 674 provides a hardware root of trust for system 600. ME 676 provides similar functionality in Intel-based systems. In another embodiment, EC 690 can provide aspects of a hardware root of trust. The root of trust relates to software processes and/or hardware devices that ensure that firmware and other software necessary for operation of an information handling system is operating as expected.

Information handling system 600 can include additional components and additional busses, not shown for clarity. For example, system 600 can include multiple processor cores, audio devices, and the like. While a particular arrangement of bus technologies and interconnections is illustrated for the purpose of example, one of skill will appreciate that the techniques disclosed herein are applicable to other system architectures. System 600 can include multiple CPUs and redundant bus controllers. One ore more components can be integrated together. For example, portions of chipset 606 can be integrated within CPU 602. In an embodiment, chipset 606 can include a platform controller hub (PCH). System 600 can include additional buses and bus protocols, for example I2C and the like. Additional components of information handling system 600 can include one or more storage devices that can store machine-executable code, one or more communications ports for communicating with external devices, and various input and output (I/O) devices, such as a keyboard, a mouse, and a video display.

For purposes of this disclosure information handling system 600 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 600 can include processing resources for executing machine-executable code, such as CPU 602, a programmable logic array (PLA), an embedded device such as a System-on-a-Chip (SoC), or other control logic hardware. Information handling system 600 can also include one or more computer-readable medium for storing machine-executable code, such as software or data.

UEFI BIOS code 672 can be referred to as a firmware image, and the term BIOS is herein used interchangeably with the term firmware image, or simply firmware. In an embodiment, UEFI BIOS 672 can be substantially compliant with one or more revisions of the Unified Extensible Firmware Interface (UEFI) specification. As used herein, the term Extensible Firmware Interface (EFI) is used synonymously with the term UEFI. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the OS. The UEFI specification allows for the extension of platform firmware by loading UEFI driver and UEFI application images. For example, an original equipment manufacturer can include customized or proprietary images to provide enhanced control and management of the information handling system 600. While the techniques disclosed herein are described in the context of a UEFI compliant system, one of skill will appreciate that aspects of the disclosed systems and methods can be implemented at substantially any information handling system having configurable firmware.

UEFI BIOS code 672 includes instructions executable by CPU 602 to initialize and test the hardware components of system 600, and to load a boot loader or an operating system (OS) from a mass storage device. UEFI BIOS code 672 additionally provides an abstraction layer for the hardware, i.e. a consistent way for application programs and operating systems to interact with the keyboard, display, and other input/output devices. When power is first applied to information handling system 600, the system begins a sequence of initialization procedures. During the initialization sequence, also referred to as a boot sequence, components of system 600 are configured and enabled for operation, and device drivers can be installed. Device drivers provide an interface through which other components of the system 600 can communicate with a corresponding device.

The storage capacity of SPI flash device 670 is typically limited to 32 MB or 54 MB of data. However, original equipment manufacturers (OEMs) of information handling systems may desire to provide advanced firmware capabilities, resulting in a BIOS image that is too large to fit in SPI flash device 670. Information handling system can include other non-volatile flash memory devices, in addition to SPI flash device 670. For example, memory 604 can include non-volatile memory devices in addition to dynamic random access memory devices. Such memory is referred to herein as non-volatile dual in-line memory module (NVDIMM) devices. In addition, hard drive 624 can include non-volatile storage elements, referred to as a solid state drive (SSD). For still another example, information handling system 600 can include one or more non-volatile memory express (NVMe) devices. Techniques disclosed herein provide for storing a portion of a BIOS image at one or more non-volatile memory devices in addition to SPI flash device 670.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A control plane management node of a multiple node environment, the control plane management node comprising:

a memory storage configured to store a private key for a user of the multiple node environment in a first management configuration; and a processor to communicate with the memory storage, the processor to:

provide a plurality of key management configurations to the user, wherein the key management configurations include the first management configuration, a second key management configuration, and a third key management configuration;

in response to the first key management configuration being selected, the processor to:

create the private key for the user; and store the private key associated with the user in the memory storage of the control plane management node;

in response to the second key management configuration being selected, the processor to:

configure the user node to create the private key; and configure the user node to store the private key in a second memory storage of the user node;

in response to the third key management configuration being selected, the processor to:

configure a trusted platform module of the user node to create the private key; and configure the trusted platform module of the user node to store the private key in the trusted platform module.

2. The control plane management node of claim 1, in response to the third key management configuration being selected, the processor further to:

receive a certificate to request an operation to be performed at an endpoint node of the multiple node environment;
in response to the reception of the certificate, the processor to provide the certificate to the user node for signing by the trusted platform module of the user node with the private user key; and
receive a signed certificate from the user node.

3. The control plane management node of claim 1, in response to the second key management configuration being selected, the processor further to:
receive a certificate to request an operation to be performed at an endpoint node of the multiple node environment;
in response to the reception of the certificate, the processor to provide the certificate to the user node for signing with the private user key; and
receive a signed certificate from the user node.

4. The control plane management node of claim 1, wherein the user node is located outside of a control plane of the multiple node environment.

5. The control plane management node of claim 1, wherein the creation of the private key for the user by the processor is in response to a first log on of the user to the multiple node environment.

6. The control plane management node of claim 1, wherein the creation of the private key for the user by the processor is in response to receiving a key request from the user.

7. A method comprising:
detecting, at a control plane management node of a multiple node environment, a user of the multiple node environment;
providing a plurality of key management configurations to the user, wherein the key management configurations include first, second, and third key management configurations;
in response to the first key management configuration being selected:
creating, by the control plane management node, a private key for the user; and
storing the private key associated with the user in a memory storage of the control plane management node;
in response to the second key management configuration being selected:
configuring the user node to create the private key; and
configuring the user node to store the private key in a second memory storage of the user node; and
in response to the second key management configuration being selected:
configuring a trusted platform module of the user node to create the private key; and
configuring the trusted platform module of the user node to store the private key in the trusted platform module.

8. The method of claim 7, in response to the third key management configuration being selected, the method further comprises:
receiving a certificate to request an operation to be performed at an endpoint node of the multiple node environment;
in response to the reception of the certificate, providing the certificate to the user node for signing by the trusted platform module of the user node with the private user key; and
receiving a signed certificate from the user node.

9. The method of claim 7, in response to the second key management configuration being selected, the method further comprises:
receiving a certificate to request an operation to be performed at an endpoint node of the multiple node environment;
in response to the reception of the certificate, providing the certificate to the user node for signing with the private user key; and
receiving a signed certificate from the user node.

10. The method of claim 7, wherein the user node is located outside of a control plane of the multiple node environment.

11. The method of claim 7, wherein the creating of the private key for the user is in response to receiving a key request from the user.

12. The method of claim 7, wherein the creating of the private key for the user is in response to a first log on of the user to the multiple node environment.

13. A method comprising:
detecting, at a control plane management node of a multiple node environment, a user of the multiple node environment;
providing a plurality of key management configurations to the user, wherein the key management configurations include first, second, and third key management configurations;
if the first key management configuration is selected, then:
creating, by the control plane management node, a private key for the user;
storing the private key associated with the user in a memory storage of the control plane management node;
receiving a certificate to request an operation to be performed at an endpoint node of the multiple node environment;
in response to the reception of the certificate, signing the certificate with the private user key;
if the second key management configuration is selected, then:
creating, by the user node, the private key;
storing, by the user node, in a memory storage of the user node;
receiving, by the control plane management node, a certificate to request an operation to be performed at an endpoint node of the multiple node environment;
in response to the reception of the certificate, providing, by the control plane management node, the certificate to the user node for signing with the private user key; and
receiving, by the control plane management node, a signed certificate from the user node: and
if the second key management configuration is selected, then:
creating the private key in a trusted platform module of the user node; and
storing the private key in the trusted platform module of the user node.

14. The method of claim 13, in response to the third key management configuration being selected, the method further comprises:
receiving a certificate to request an operation to be performed at an endpoint node of the multiple node environment;

in response to the reception of the certificate, providing the certificate to the user node for signing by the trusted platform module of the user node with the private user key; and receiving a signed certificate from the user node.

15. The method of claim 13, wherein the user node is located outside of a control plane of the multiple node environment.

16. The method of claim 13, wherein the creating of the private key for the user is in response to receiving a key request from the user.

17. The method of claim 13, wherein the creating of the private key for the user is in response to a first log on of the user to the multiple node environment.

* * * * *